(12) United States Patent
Roleder

(10) Patent No.: US 10,370,628 B2
(45) Date of Patent: *Aug. 6, 2019

(54) CONTAINER ASSEMBLY WITH IMPROVED RETAINER ASSEMBLY AND FLAVOR INSERTS FOR AGING A LIQUID

(71) Applicant: Jonathan Roleder, San Diego, CA (US)

(72) Inventor: Jonathan Roleder, San Diego, CA (US)

(*) Notice: Subject to any disclaimer, the term of this patent is extended or adjusted under 35 U.S.C. 154(b) by 106 days.

This patent is subject to a terminal disclaimer.

(21) Appl. No.: 15/349,276

(22) Filed: Nov. 11, 2016

(65) Prior Publication Data

US 2017/0058241 A1    Mar. 2, 2017

Related U.S. Application Data

(63) Continuation of application No. 14/238,678, filed as application No. PCT/US2012/051012 on Aug. 15, 2012, now Pat. No. 9,523,068.

(Continued)

(51) Int. Cl.
| | |
|---|---|
| *C12G 3/07* | (2006.01) |
| *C12H 1/22* | (2006.01) |
| *B65D 8/00* | (2006.01) |

(52) U.S. Cl.
CPC .............. *C12H 1/22* (2013.01); *B65D 9/04* (2013.01); *C12G 3/07* (2019.02); *Y10T 29/49826* (2015.01)

(58) Field of Classification Search
CPC . C12G 3/065; C12G 3/07; C12H 1/22; C12H 1/16; B65D 9/04

(Continued)

(56) References Cited

U.S. PATENT DOCUMENTS

| | | |
|---|---|---|
| 2,017,235 A | 10/1935 | Drew |
| 2,135,622 A | 11/1938 | Nagle |

(Continued)

FOREIGN PATENT DOCUMENTS

| | | |
|---|---|---|
| AU | 2007231868 A1 | 5/2008 |
| EP | 1199351 A2 | 4/2002 |

(Continued)

OTHER PUBLICATIONS

The International Search Report and the Written Opinion of the International Searching Authority, dated Nov. 6, 2012, PCT/US2012/051012 (related application).

(Continued)

*Primary Examiner* — Reginald Alexander
(74) *Attorney, Agent, or Firm* — Roeder & Broder LLP; Steven G. Roeder

(57) ABSTRACT

A container assembly (10) for retaining a liquid (14) during aging of the liquid (14) includes a container (12), a first flavor insert (16), and an insert retainer assembly (18). The container (12) defines a chamber (12A) which receives and retains the liquid (14). The first flavor insert (16) imparts a flavor on the liquid (14). The insert retainer assembly (18) is positioned within the chamber (12A) and is secured to the container (12). The insert retainer assembly (18) includes an alignment rack (30) and a retainer rack (32). The alignment rack (30) includes a first alignment guide (30C) that guides the first flavor insert (16) during positioning of the first flavor insert (16) within the container (12). The retainer rack (32) has a first attacher (32C) that selectively and individually engages the first flavor insert (16) to inhibit large scale movement of the first flavor insert (16) relative to the retainer rack (32).

20 Claims, 12 Drawing Sheets

Related U.S. Application Data

(60) Provisional application No. 61/523,795, filed on Aug. 15, 2011.

(58) Field of Classification Search
USPC .............................. 99/277.2, 277.1; 217/88
See application file for complete search history.

(56) References Cited

U.S. PATENT DOCUMENTS

| | | | |
|---|---|---|---|
| 2,289,245 A | 7/1942 | Dant | |
| 2,657,629 A | 11/1953 | Gibson | |
| 3,021,780 A | 2/1962 | Bobbe | |
| 3,119,321 A | 1/1964 | Deal | |
| 4,073,955 A | 2/1978 | Koppelman | |
| 4,210,676 A | 7/1980 | Dudar et al. | |
| 4,558,639 A | 12/1985 | Hojnoski | |
| 4,838,419 A | 6/1989 | Weits et al. | |
| 5,054,381 A | 10/1991 | Depeaux et al. | |
| 5,092,488 A | 3/1992 | Pradel | |
| 5,174,461 A | 12/1992 | Sullivan | |
| 5,311,811 A | 5/1994 | Kuzyk | |
| 5,537,913 A | 7/1996 | Vowles | |
| 5,647,268 A | 7/1997 | Sullivan | |
| 5,960,708 A | 10/1999 | Detemple et al. | |
| 6,378,419 B1 | 4/2002 | Ecklein | |
| 7,186,428 B1 | 3/2007 | Huige et al. | |
| 7,284,476 B2 | 10/2007 | Roleder | |
| 9,032,864 B2 | 5/2015 | Roleder | |
| 9,523,068 B2 | 12/2016 | Roleder | |
| 2004/0069148 A1 | 4/2004 | Fenaroli | |
| 2006/0000362 A1 | 1/2006 | Roleder | |
| 2008/0000356 A1 | 1/2008 | Eustis | |
| 2012/0204728 A1 | 8/2012 | Roleder | |
| 2014/0202337 A1 | 7/2014 | Roleder | |

FOREIGN PATENT DOCUMENTS

| | | |
|---|---|---|
| FR | 2864965 A1 | 7/2005 |
| GB | 2188902 A | 10/1987 |
| WO | WO0149819 A1 | 7/2001 |
| WO | WO2005078065 A1 | 8/2005 |
| WO | WO2006007493 A1 | 1/2006 |
| WO | WO2010031115 A1 | 3/2010 |
| WO | WO2011047187 A1 | 4/2011 |

OTHER PUBLICATIONS

The International Search Report and the Written Opinion of the International Searching Authority, dated Dec. 20, 2010, PCT/US2010/052721.

The International Preliminary Report on Patentability of the International Bureau, dated Jan. 9, 2007, PCT/US2005/022791.

Tagliabue, John. "Wine Without Barrels? Sacre Bleu!" The New York Times, Oct. 5 or 6, 2003.

Oak Alternatives. "Tank Stave Systems." http://www.worldcooperage.com/pages/product_alt_tss.html, Nov. 11, 2003.

Oak Alternatives. "Barrel Renewal Systems." http://www.worldcooperage.com/media/cartimages/AltStaves4_large.jpg, Nov. 11, 2003.

Barrel Builders, Inc. "Insert Systems." http://barrelbuilders.com/pg15.htm, Nov. 11, 2003.

The International Preliminary Report on Patentability of the International Searching Authority, dated Feb. 18, 2014, for PCT/US2012/051012 (related application).

First Examination Report, New Zealand Intellectual Property Office, dated Nov. 19, 2014, Jonathan William Roleder, New Zealand Application No. 621,258. (related application).

Extended European Search Report, European Patent Office, dated Mar. 5, 2015, Jonathan William Roleder, European application 12 823 796.3 (related application).

First Examination Report, Australian Patent Office, dated Jul. 10, 2015, Jonathan William Roleder, Australian application 2012296587 (related application).

First Examination Report, Chile Patent Office, dated Nov. 18, 2015, Jonathan William Roleder, Chilean application No. 00383-2014 (related application). *Provided Herewith Is An Electronic Translation Of The Document. The Applicant Is Not Sure Of The Accuracy Of The Translation. Please Contact The Undersigned If You Believe That A Human Translation Of This Document Is Necessary.

First Examination Report, European Patent Office, dated Dec. 21, 2015, Jonathan William Roleder, European application No. 12823796.3 (related application).

Amendment and Response dated Feb. 15, 2016 to the First Examination Report, Chile Patent Office, dated Nov. 18, 2015, Jonathan William Roleder, Chilean application No. 00383-2014 (related application). *Provided Herewith Is An Electronic Translation Of The Document. The Applicant Is Not Sure Of The Accuracy Of The Translation. Please Contact The Undersigned If You Believe That A Human Translation Of This Document Is Necessary.

Amendment and Response, filed Feb. 24, 2016, to First Examination Report, Australian Patent Office, dated Jul. 10, 2015, Jonathan William Roleder, Australian application 2012296587 (related application).

Amendment and Response, filed Feb. 15, 2016, to First Examination Report, New Zealand Intellectual Property Office, dated Nov. 19, 2014, Jonathan William Roleder, New Zealand Application No. 621,258. (related application).

Second Examination Report, New Zealand Intellectual Property Office, dated Feb. 19, 2016, Jonathan William Roleder, New Zealand Application No. 621,258. (related application).

Amendment and Response, filed Mar. 24, 2016, to Second Examination Report, New Zealand Intellectual Property Office, dated Feb. 19, 2016, Jonathan William Roleder, New Zealand Application No. 621,258. (related application).

Response to First Examination Report, European Patent Office, dated Apr. 20, 2016, Jonathan William Roleder, European application No. 12823796.3 (related application).

The International Search Report and the Written Opinion of the International Searching Authority, dated Jun. 20, 2006, PCT/US2005/022791 (related application).

The International Preliminary Report on Patentability of the International Bureau, dated Apr. 17, 2012, PCT/US2010/052721.

CONTAINER ASSEMBLY WITH IMPROVED RETAINER ASSEMBLY AND FLAVOR INSERTS FOR AGING A LIQUID

RELATED APPLICATION

This application claims priority on U.S. application Ser. No. 14/238,678 entitled "CONTAINER ASSEMBLY WITH IMPROVED RETAINER ASSEMBLY AND FLAVOR INSERTS FOR AGING A LIQUID". U.S. application Ser. No. 14/238,678 claims priority on PCT/US12/51012 entitled "CONTAINER ASSEMBLY WITH IMPROVED RETAINER ASSEMBLY AND FLAVOR INSERTS FOR AGING A LIQUID". PCT/US12/51012 claims priority on U.S. Provisional Application Ser. No. 61/523,795 filed on Aug. 15, 2011, and entitled "Stave Assembly For Aging a Liquid". As far as is permitted, the contents of U.S. application Ser. No. 14/238,678; PCT/US12/51012; and U.S. Provisional Application Ser. No. 61/523,795 are incorporated herein by reference.

BACKGROUND

Wood barrels are commonly used to age wine and other beverages. Unfortunately, wood barrels are relatively expensive to make and have a relatively short operational life. For example, a high end barrel used for only the finest wines is typically made from French oak and is very expensive. Additionally, the chemical ability of the wood to effect and impart flavor nuances expires rapidly and a wood barrel can typically only be considered to be in its prime for two to three years, e.g. one to two vintages. Once the traditional wood barrel had exhausted its chemical ability to impart flavors on the liquid, i.e. has gone "oak neutral", the conventional barrel is often sold on the used market or committed to lesser quality beverages. This creates a rapidly depreciating asset and investment for the beverage maker.

SUMMARY

The present invention is directed to a container assembly for retaining a liquid during aging of the liquid. In various embodiments, the container assembly includes a container, a first flavor insert, and an insert retainer assembly. The container defines a chamber which receives and retains the liquid. The first flavor insert imparts a flavor on the liquid. The insert retainer assembly is positioned within the chamber and is secured to the container. The insert retainer assembly includes an alignment rack and a retainer rack. The alignment rack includes a first alignment guide that guides the first flavor insert during positioning of the first flavor insert within the container. The first alignment guide includes an aperture that is larger than a cross-section of the first flavor insert. The retainer rack has a first attacher that selectively and individually engages the first flavor insert to inhibit large scale movement of the first flavor insert relative to the retainer rack. The first attacher includes a first clip that flexes open when sufficient pressure is applied with the first flavor insert.

In some embodiments, the first clip includes a pair of engagement regions that are urged apart when sufficient pressure is applied with the first flavor insert, and that are biased to move adjacent to each other so that the engagement regions retain the first flavor insert.

Additionally, in certain embodiments, the first flavor insert has a length, a width and a thickness that is less than the length and the width. In such embodiments, the pair of engagement regions are biased to be positioned a separation distance from one another when in a relaxed position, the separation distance being less than the thickness of the first flavor insert.

Further, the present invention is directed to a flavor insert, an insert retainer assembly, a method for securing a flavor insert, and a method for retaining a liquid during aging of the liquid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
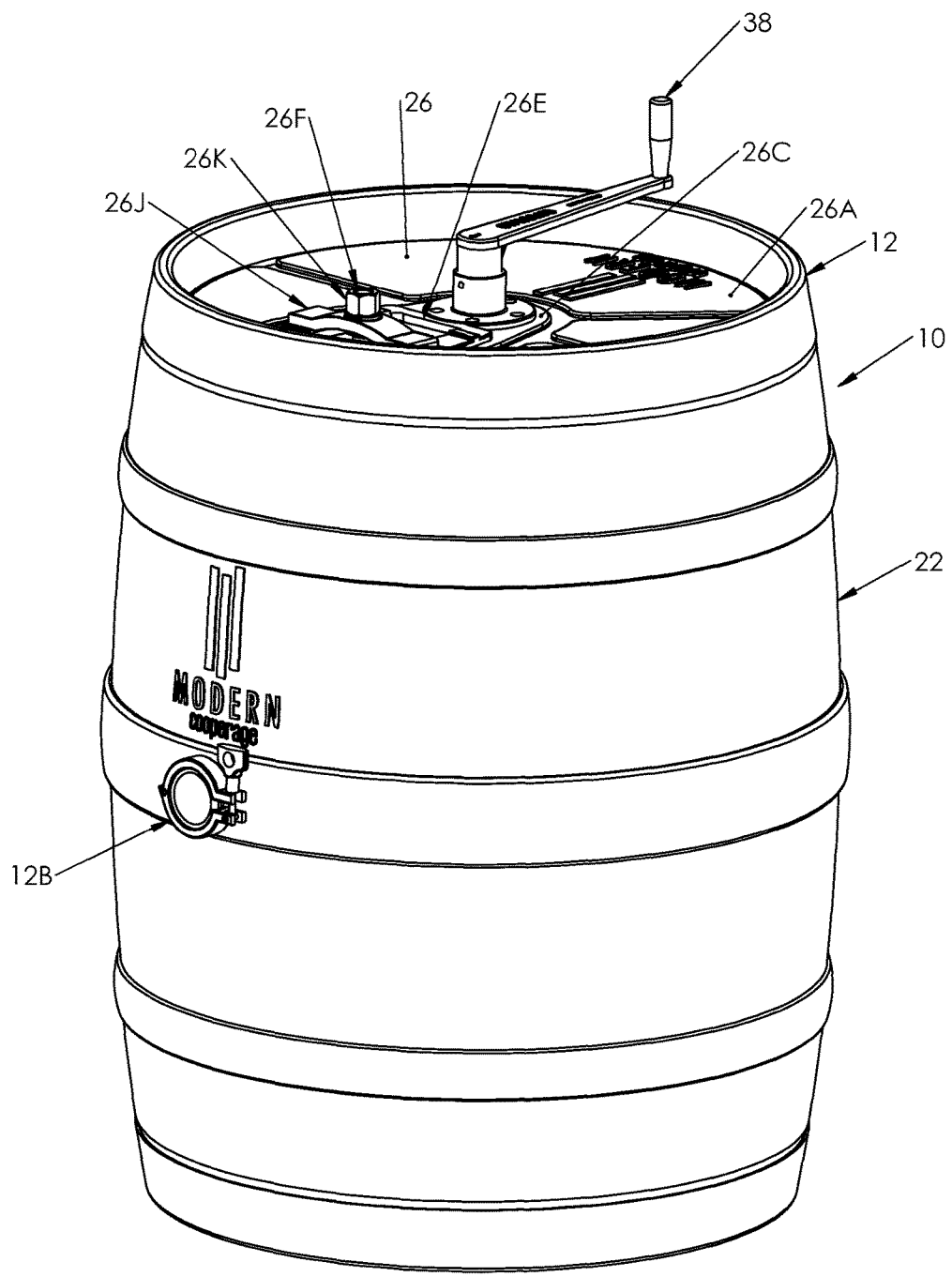
FIG. 1A is a perspective view of one embodiment of a container assembly having features of the present invention.
Figure 1B:
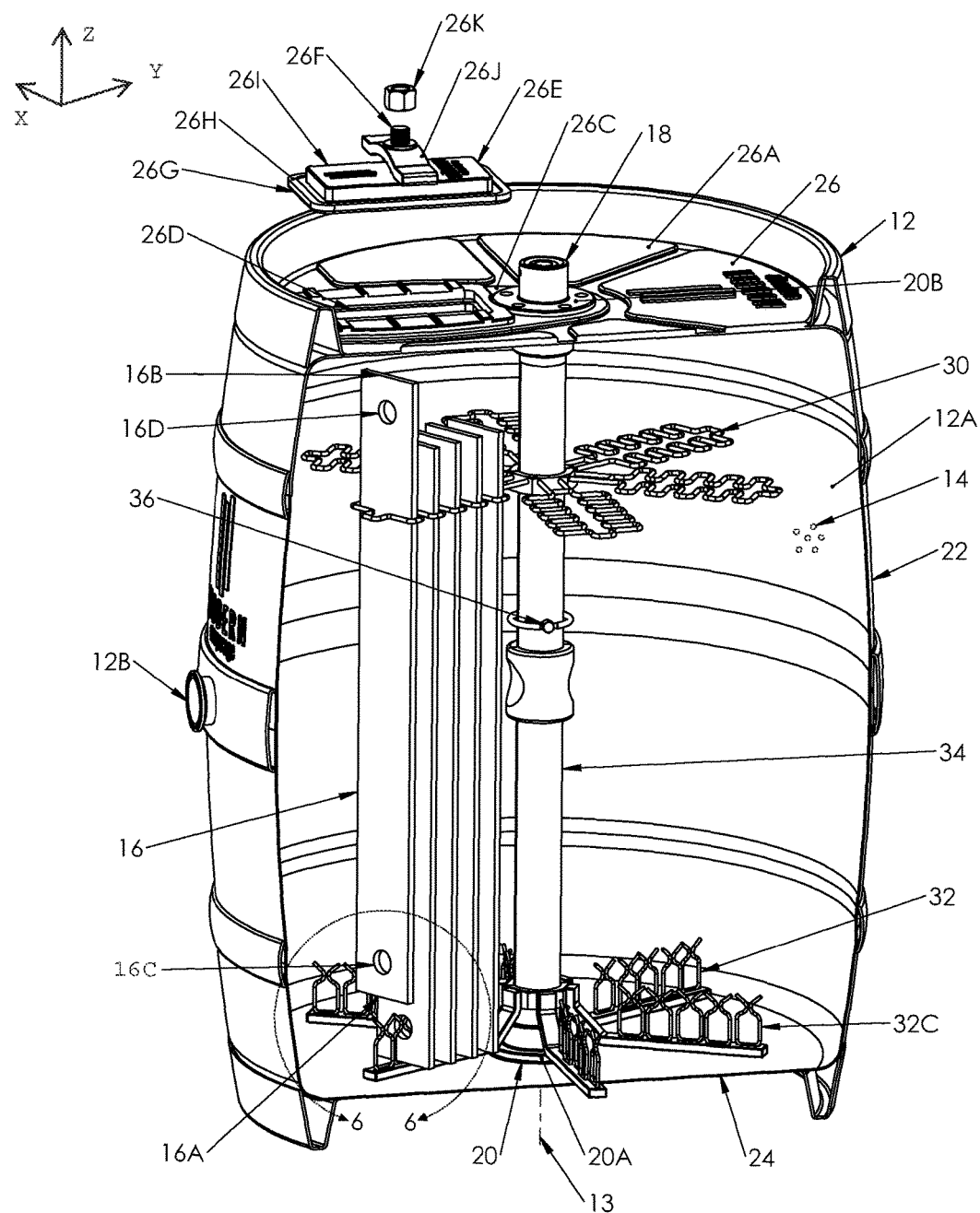
FIG. 1B is a partially exploded, and partially cut-away view of the container assembly of FIG. 1A.

FIG. 1A is a perspective view, and FIG. 1B is a partially exploded, and partially cut-away view of one embodiment of a container assembly 10 having features of the present invention. The size, shape, and number of components in the container assembly 10 can be varied to suit the design requirements of the container assembly 10. In the embodiment illustrated in FIGS. 1A and 1B, the container assembly 10 includes (i) a container 12 that retains a liquid 14 (illustrated with some circles in FIG. 1B), (ii) a plurality of flavor inserts 16 that impart a flavor on the liquid 14 during the aging process, (iii), an insert retainer assembly 18 that selectively receives and retains the flavor inserts 16, and (iv) a mount assembly 20 that mounts the insert retainer assembly 18 to the container 12.

As an overview, in certain embodiments, the insert retainer assembly 18 and the flavor inserts 16 are uniquely designed to allow for the inserts 16 to be easily, selectively, and individually added or removed from the container 12, and the flavor inserts 16 are locked in place to inhibit movement of the flavor inserts 16 when the container 12 is full of the liquid 14.

In the embodiment illustrated in FIGS. 1A and 1B, the container 12 includes a tubular-shaped side wall 22, a disk-shaped bottom 24 (illustrated more clearly in FIG. 2), and a substantially disk-shaped top 26. In one embodiment, the container 12 includes a container longitudinal axis 13. Alternatively, for example, the container 12 can be another shape, e.g. rectangular box shaped.

Additionally, the container 12 defines a chamber 12A that receives and retains the liquid 14 during an aging process. In alternative non-exclusive embodiments, the chamber 12A is sized and shaped to retain approximately 5, 10, 25, 55, 100, 500, 1000, 2500 or 5000 gallons of liquid 14. However, the chamber 12A can be larger or smaller. Further, in certain embodiments, the container 12 can include a bunghole 12B that is positioned within and/or extends through the side wall 22. The bunghole 12B is adapted to receive a pipe or other conduit (not illustrated) that can be used for filling the liquid 14 into the chamber 12A, pumping or otherwise removing the liquid 14 from the chamber 12A, or racking of the liquid 14 within the chamber 12A. In alternative embodiments, the bunghole 12B can be positioned in the bottom 24, or in the top 26 of the container 12.

As provided herein, the container assembly 10 can be used to impart a flavor on the liquid 14 during an aging process. Additionally, the container assembly 10 can be used to introduce micro-oxygenation (i.e. small amounts of oxygen) into the liquid 14 during the aging process. In one embodiment, the container assembly 10 allows for the total control of the aging of the liquid 14, including optimum processing and aging opportunities for the liquid 14. Stated another way, the container assembly 10 can be used to precisely create the perfect environment for aging the liquid 14 so that the highest quality beverage can be achieved. Further, the container assembly 10 can be easily adjusted to be used for different types of liquids 14 and the container assembly 10 can be adjusted during the aging process, if necessary, to alter the aging process.

The type of liquid 14 aged in the container assembly 10 can vary. For example, the liquid 14 can be a red wine, white wine, port, whiskey, brandy, or other beverages.

In one, non-exclusive embodiment, the side wall 22, the bottom 24 and the top 26 can be made from materials that impart substantially no flavor on the liquid 14 and that are substantially liquid impervious. For example, in one embodiment, the side wall 22, the bottom 24 and the top 26 can be made of stainless steel or aluminum. Alternatively, in certain embodiments, one or more of the side wall 22, the bottom 24 and the top 26 can be made from a wood material or some other suitable food grade material.

In one embodiment, the top 26 can include a top body 26A having a top aperture (not shown) that allows for the installation of the insert retainer assembly 18 and the mount assembly 20 there through. In FIG. 1B, the top aperture is a somewhat oval shaped and extends from near the side wall 22 to a little past a center of the top 26.

Further, in certain embodiments the top 26 also includes (i) a top plate 26C that is attached to the top body 26A over the top aperture, (ii) a container aperture 26D that extends through the top plate 26C, (iii) a door 26E that seals the container aperture 26D, and (iv) a door latch 26F that selectively secures the door 26E to the top plate 26C. In one embodiment, after that insert retainer assembly 18 is positioned in the chamber 12A and secured with the mount assembly 20 to the bottom 24 and the top plate 26C, the top plate 26C is sealed to the top body 26A (e.g. by welding or other method) over the top aperture.

In this embodiment, the top plate 26C is relatively thick to provide support for the door 26E and the insert retainer assembly 18. The added support will inhibit deformation near the door 26E, which can lead to leaking when the containers 12 are stacked on their sides. In alternative, non-exclusive embodiments, the top plate 26C can be at least approximately two, three, four, five, six, or seven times thicker than the top body 26A.

The container aperture 26D is sized and shaped to allow for the selective installation or removal of the flavor inserts 16 when the container 12 is full of liquid or empty. In certain embodiments, the container aperture 26D is generally rectangular shaped, extends radially, and in certain embodiments, is co-extensive with the top aperture 26B. Alternatively, the container aperture 26D can have a different shape and/or be positioned in a different portion of the container 12.

Additionally, the size of the container aperture 26D can vary. For example, in alternatively, non-exclusive embodiments, the size of the container aperture 26D can be such that it is less than approximately five (5), ten (10), fifteen (15), twenty (20) or twenty-five (25) percent of the total surface area of the top 26. For example, in one non-exclusive embodiment, the container aperture 26D can be substantially rectangle shaped and can be approximately four inches wide by seven and one half inches long radially. Alternatively, the container aperture 26D can be a different size. Additionally, the container aperture 26D is designed to be small enough to not significantly influence the structural integrity (significantly reduce the strength) of the top 26.

As provided herein, in certain embodiments, the flavor inserts 16 can be easily and individually added, removed or replaced via the container aperture 26D from the insert retainer assembly 18 while the liquid 14 fills the chamber 12A (or without liquid in the chamber 12A), and while the insert retainer assembly 18 is positioned within the chamber 12A. For example, in one embodiment, only a single row of flavor inserts 16 can be added or removed from the insert retainer assembly 18 at any given rotational position of the retainer insert assembly 18. Subsequently, the insert retainer assembly 18 can be rotated so that subsequent rows of the flavor inserts 16 can be individually added or removed from the chamber 12A through the container aperture 26D. With this design, the flavor inserts 16 can be removed, renewed, changed, added to or decreased from during the aging process, while the liquid 14 is still in the chamber 12A. The flexibility to change, add or remove the flavor inserts 16 continues through the complete aging process right up to the bottling. This process can be repeated as many times as necessary to extract the optimum flavor and structure from the flavor inserts 16.

The door 26E is used to selectively open the chamber 12A to allow for access to the flavor inserts 16, and close to seal the chamber 12A. In FIG. 1B, the door 26E is generally rectangular shaped and includes (i) a lower flange 26G that is positioned below the top plate 26C within the chamber 12A, (ii) a seal 26H that is positioned between the lower flange 26G and the top plate 26C, and (iii) a door body 26I that extends through the container aperture 26D. With this design, to install the door 26E, the door 26E is initially manipulated so that the lower flange 26G and the seal 26H are positioned below the top plate 26C in the chamber 12A with the door body 26I extending through the container aperture 26D. Next, the door latch 26F is actuated. In contrast, during opening of the door 26E, the door latch 26F is disengaged. Next, the door 26E is manipulated to remove the lower flange 26G from the chamber 12A through the container aperture 26D.

The door latch 26F is used to selectively lock the door 26E to the top plate 26C. In the non-exclusive embodiment illustrated in FIG. 1B, the door latch 26F includes a latch beam 26J and a latch fastener 26K. In this embodiment, the latch beam 26J is a rigid, somewhat arch shaped beam that can be rotated relative to the door 26E from a first position (not shown) where the latch beam 26J is positioned entirely over the door 26E and aligned with the long dimension of the door 26E, and a second position (shown in FIGS. 1A and 1B) where the latch beam 26J is transverse to the door 26E (aligned with short dimension of door 26E) and able to engage the top plate 26C. Moreover, in this embodiment, the latch fastener 26K (e.g. a threaded rod secured to the door 26E and a nut) selectively urges the latch beam 26J towards the door 26E. With this design, when the latch beam 26J is in the second position (transverse to the door 26E), then the latch fastener 26K can be used to urge the lower flange 26G and the seal 26H upward against the bottom of the top plate 26C.

It should be noted that this unique door assembly inhibits leaking at the door 26E, even when multiple containers assemblies 10 are stacked on their sides and subjected to some deformation.

With the present design, the container 12 and the door 26E can be easily cleaned and reused with many different liquids 14. Moreover, having the ability to quickly and easily change the flavor inserts 16 allows the user to easily convert his barrel inventory from one type of wood flavoring component to another, even adding more wood or subtracting undesirable flavoring components, without having to purchase entirely new containers. Thus, the present invention provides many economic, environmental and manufacturing advantages over the older more traditional aging equipment. For example, once the initial investment in the container 12 is made, the cost to achieve the highest barrel quality is only a function of the cost of the flavor inserts 16. The cost to replace the flavor inserts 16 inside the container 12 with flavor inserts 16 of comparable wood and quality can be less than approximately 10% the cost of a similar new wood barrel.

The flavor inserts 16 are used to impart a desired flavor on the liquid 14 during the aging process. The number of flavor inserts 16 utilized and the type of flavor inserts 16 utilized can be adjusted to precisely adjust the desired outcome of the liquid 14. With this design, the perfect material and the perfect amount of material for the liquid 14 for extracting flavor during the aging process can be utilized. With the ability to change the number and types of flavor inserts 16 utilized during the aging process, the present invention provides great flexibility in the timing and the flavor development of the liquid 14 during the aging process. As non-exclusive examples, one or more of the flavor inserts 16 can be made of different species of wood, such as white oak, red oak, redwood, douglas fir, maple, birch, hickory, and/or any combination thereof.

The ability to impact the flavor of the liquid 14 by inserting different types of flavor inserts 16 into the chamber 12A is a great benefit in creating the finest beverage possible during the aging process. For example, at the beginning of the aging process, ten flavor inserts 16 can be placed in the chamber 12A. The flavor inserts 16 can be a first type of wood or some of the flavor inserts 16 can be of the first type of wood and some of the flavor inserts 16 can be of another type of wood. Subsequently, during the aging process, one or more flavor inserts 16 can be added or removed from the chamber 12A to adjust and influence the aging process. If the flavor inserts 16 are added, the flavor inserts 16 can be of the first type of wood or another type of wood.

In one embodiment, each flavor insert 16 is generally thin beam shaped and has a generally rectangular shaped cross-section. Alternatively, for example, one or more of the flavor inserts 14 can have another cross-sectional shape, such as a circular, oval, triangle, or an octagon.

Additionally, in certain embodiments, each flavor insert 16 includes a distal, first end 16A, an opposed, proximal second end 16B, a retainer aperture 16C, and a removal aperture 16D. In this embodiment, the retainer aperture 16C is used to attach and secure the flavor insert 16 to the insert retainer assembly 18, and the removal aperture 16D can be used to grab the flavor insert 16 (e.g. with a tool) to add or remove the flavor insert 16 from the chamber 12A. In one non-exclusive embodiment, the retainer aperture 16C can be positioned near the first end 16A, and the removal aperture 16D can be positioned near the second end 16B. Alternatively, one or both of the apertures 16C, 16D can be at different location, or the flavor insert 16 can be designed without one or both of the apertures 16C, 16D It should be noted that any of the flavor inserts 16 can be referred to as a first, second, third, fourth, fifth, etcetera, flavor insert.

In one embodiment, the insert retainer assembly 18 selectively retains the flavor inserts 16 spaced apart from the container 12. The design of the insert retainer assembly 18 can be varied to suit the specific design requirements of the container assembly 10. In one embodiment, the insert retainer assembly 18 can have a modular design such that the insert retainer assembly 18 can be positioned within and/or removed from the container 12 through the top aperture without removing the top 26 of the container 12, and without otherwise disassembling the container 12.

Additionally, in this embodiment, the insert retainer assembly 18 retains the flavor inserts 14 spaced apart from each other so that almost the entirety of each flavor insert 16 is exposed to the liquid 16 in the chamber 12A. Further, in one embodiment, the insert retainer assembly 18 retains the flavor inserts 14 in a fashion that allows the flavor inserts 14 to expand and contract.

In the embodiment illustrated in FIG. 1B, the insert retainer assembly 18 includes an alignment rack 30, a retainer rack 32, and a connector assembly 34 that fixedly connects the alignment rack 30 to the retainer rack 32. The design of each of these components can be varied pursuant to the teachings provided herein. In one embodiment, the insert retainer assembly 18 can retain up to thirty flavor inserts 16. In this embodiment, the insert retainer assembly 18 retains the flavor inserts 16 is six rows of five flavor inserts 16. Alternatively, the insert retainer assembly 18 can be designed to retain more than or fewer than thirty flavor inserts 16.

Figure 2A:
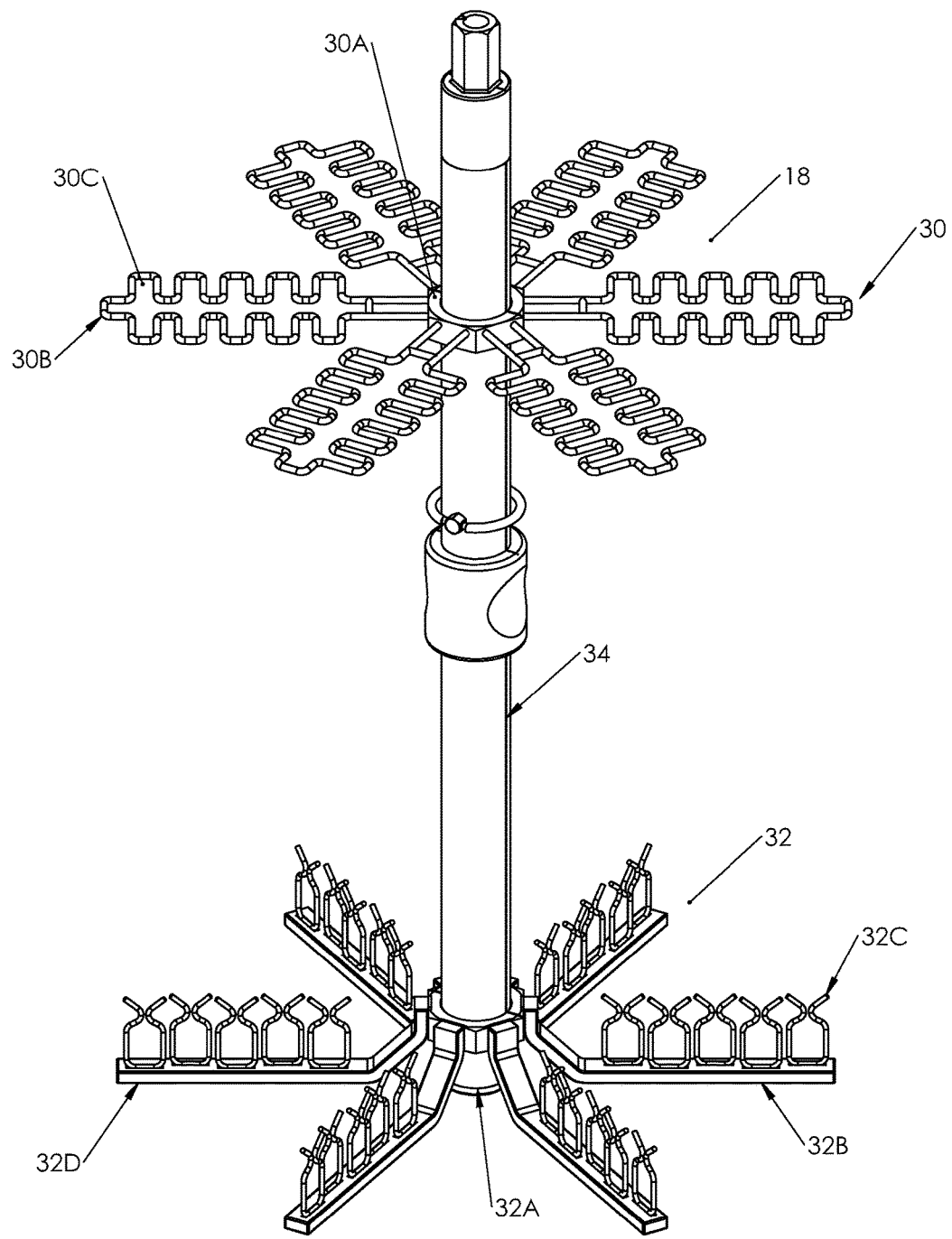
FIG. 2A is a perspective view of an insert retainer assembly having features of the present invention.
Figure 2B:
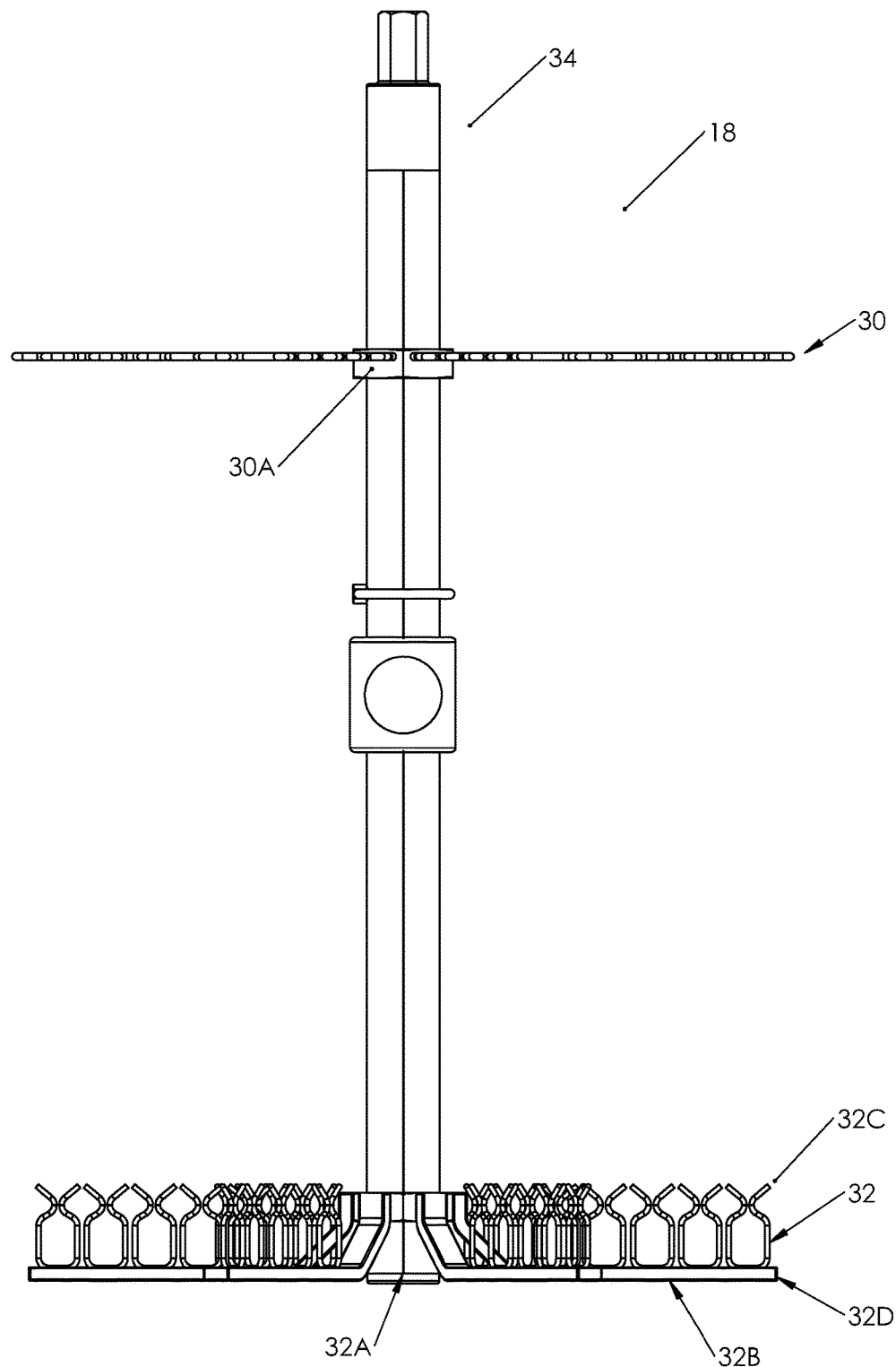
FIG. 2B is a side view of the insert retainer assembly of FIG. 2A.
Figure 2C:
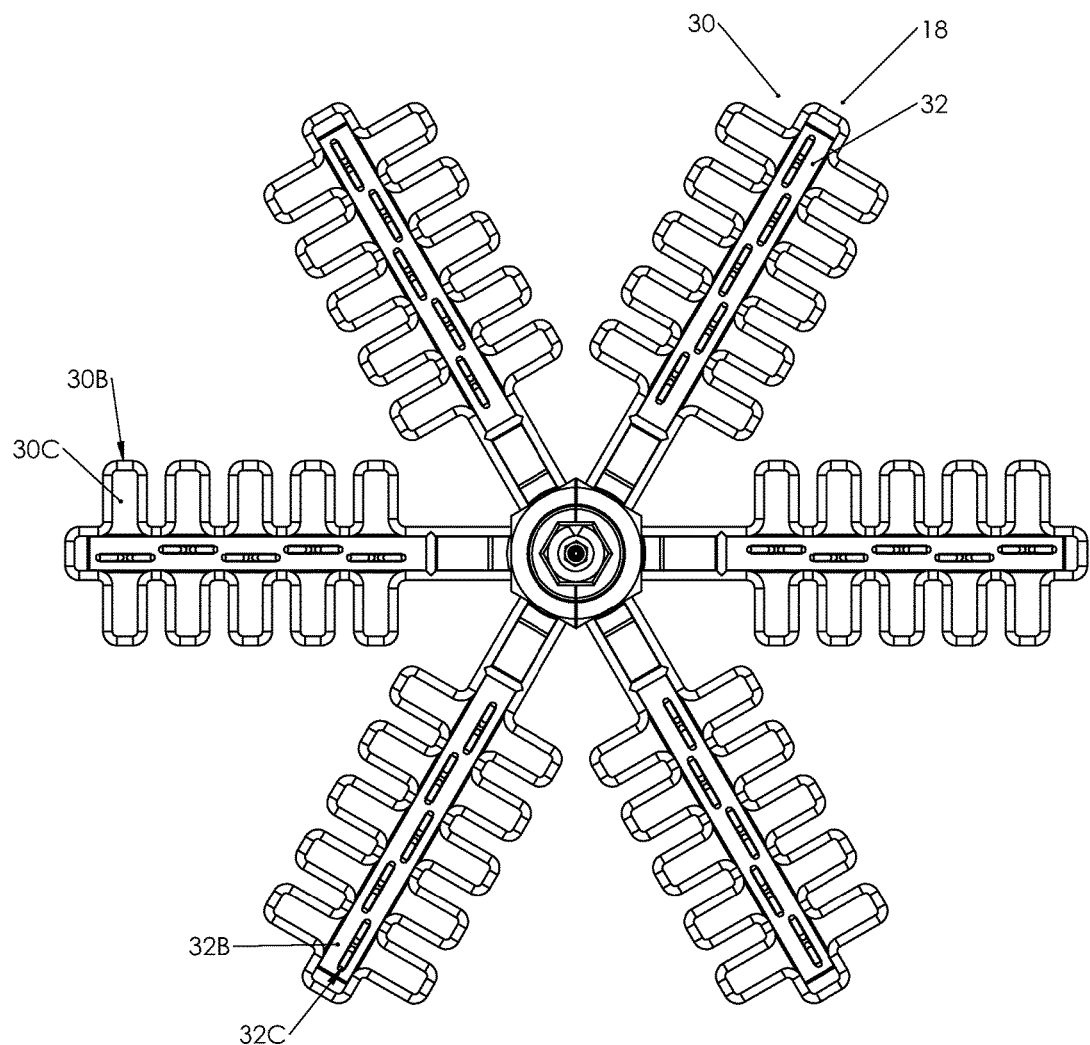
FIG. 2C is a top view of the insert retainer assembly of FIG. 2A.
Figure 3A:
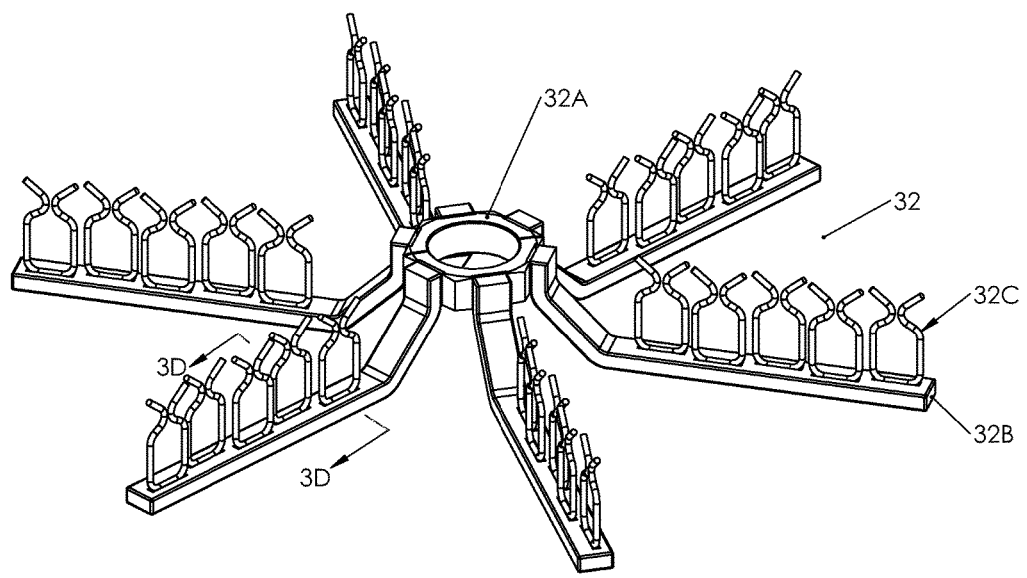
FIG. 3A is a perspective view of a retainer rack having features of the present invention.
Figure 3B:
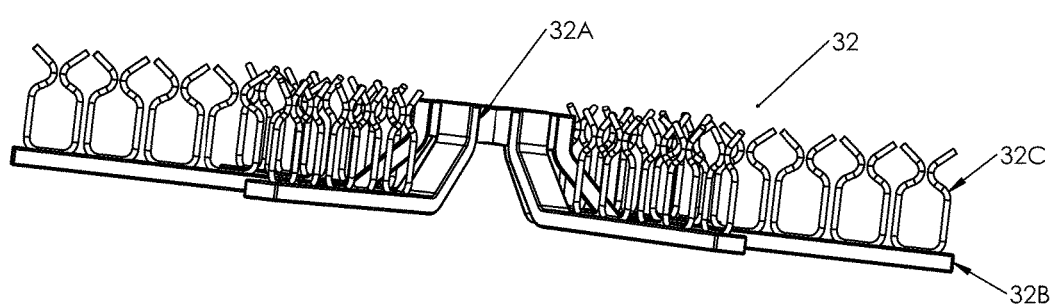
FIG. 3B is another perspective view of the retainer rack of FIG. 3A.
Figure 3C:
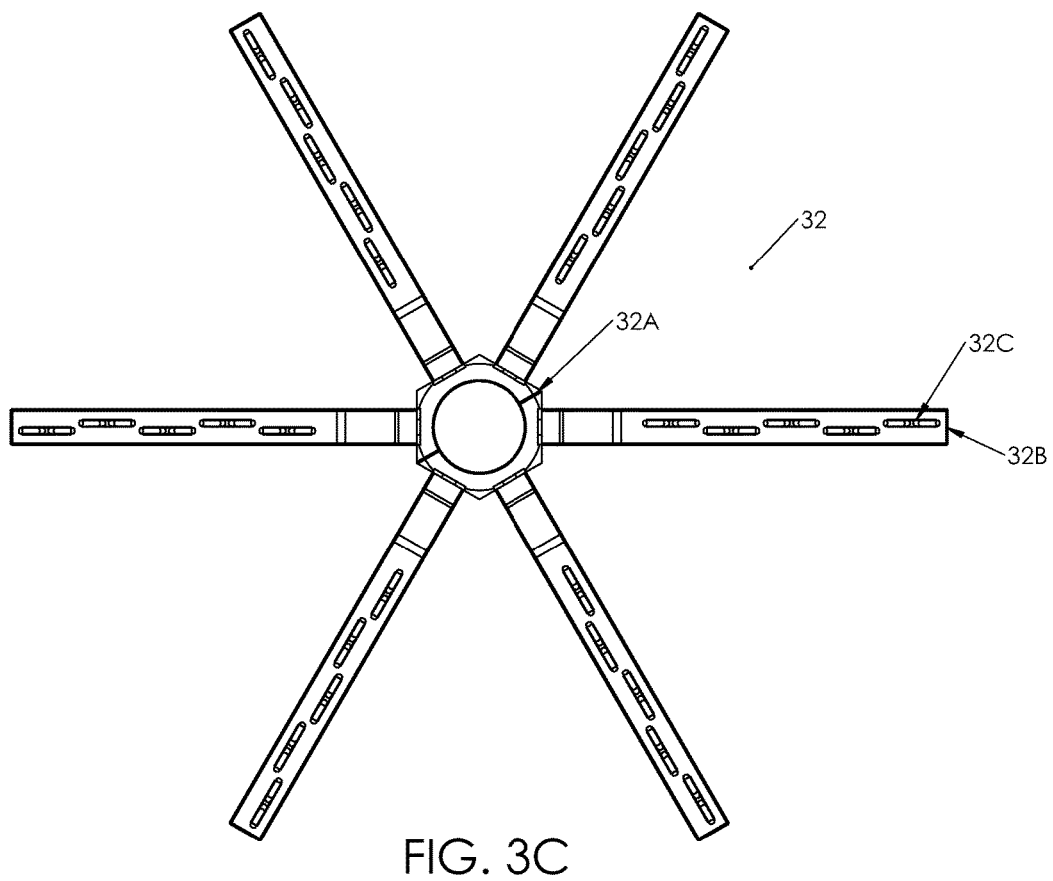
FIG. 3C is a top view of the retainer rack of FIG. 3A.
Figure 3D:
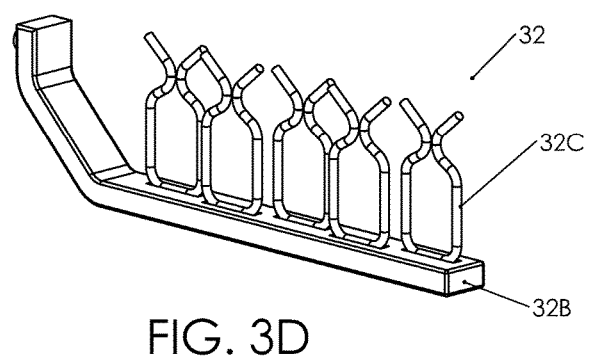
FIG. 3D is a cut-away view taken on line 3D-3D in FIG. 3A.
Figure 3G:
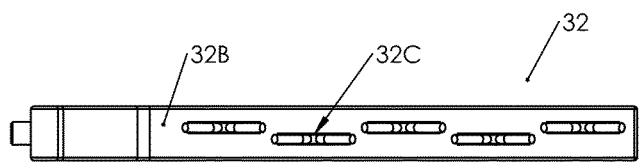
FIG. 3G is a top view of the portion of the retainer rack illustrated in FIG. 3D.
Figure 3E:
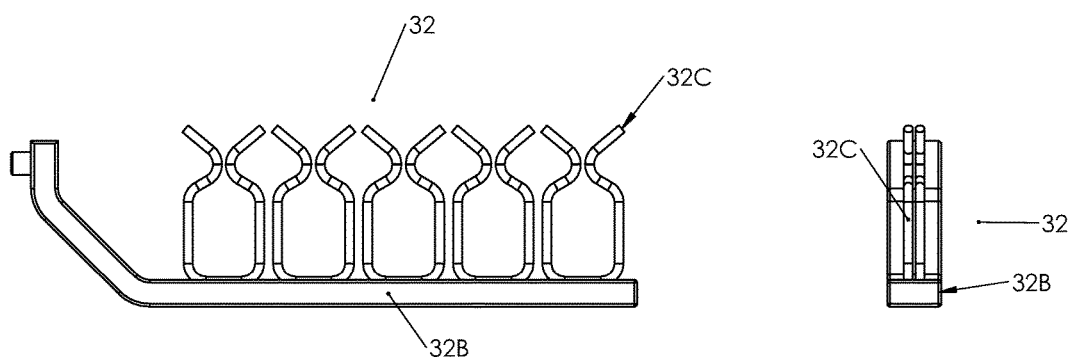
FIG. 3E is a side view of the portion of the retainer rack illustrated in FIG. 3D.
Figure 3F:
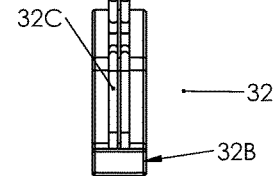
FIG. 3F is an end view of the portion of the retainer rack illustrated in FIG. 3D.

FIGS. 2A-2C illustrate one non-exclusive embodiment of the insert retainer assembly 18. In this embodiment, the alignment rack 30 includes a central, tubular shaped alignment hub 30A, and one or more alignment arms 30B that extend radially from the alignment hub 30A. In this embodiment, the insert retainer assembly 18 includes six alignment arms 30B that are equally spaced apart and cantilever away from the alignment hub 30A. Alternatively, the insert retainer assembly 18 can include more than six or fewer than six alignment arms 30B.

Further, the design of each alignment arm 30B can be varied. For example, each alignment arm 30B can define five, spaced apart alignment guides 30C that are used to guide the flavor inserts 16 during installation and to maintain the flavor inserts 16 spaced apart from each other. For example, each alignment guide 30C can be a generally rectangular shaped aperture that is slightly larger than the cross-section of the flavor inserts 16 (illustrated in FIG. 1B). In one embodiment, the alignment guides 30C are aligned radially along the respective alignment arm 30B.

Alternatively, each alignment arm 30B can include more than five or fewer than five alignment guides 30C. Still alternatively, for example, one or more of the alignment guides 30C can be another shape, such as a circle, a triangle or an octagon.

In FIGS. 2A-2C, the retainer rack 32 includes a central, tubular shaped retainer hub 32A, and one or more retainer arms 32B that extend radially from the retainer hub 32A. In this embodiment, the insert retainer assembly 18 includes six retainer arms 32B that are equally spaced apart and cantilever away from the retainer hub 32A. Alternatively, the insert retainer assembly 18 can include more than six or fewer than six retainer arms 32B. Generally speaking, the number of retainer arms 32B can correspond to the number of alignment arms 30B.

Further, the design of each retainer arm 32B can be varied. For example, each retainer arm 32B can include a rigid retainer beam 32D and an attacher assembly that includes a plurality (e.g. five) of spaced apart attachers 32C that are fixedly secured (e.g. welded or otherwise secured) to the retainer beam 32D. In one embodiment, each attacher 32C can be used to inhibit large scale movement of a signal corresponding flavor inserts 16 along an axis that is parallel to the container longitudinal axis. Further, each attacher 32C can be used to maintain one flavor inserts 16 spaced apart from the other flavor inserts 16. Alternatively, each retainer arm 32B can include more than five or fewer than five attachers 32C. In this embodiment, the attachers 32C are slightly offset from each other radially along the respective retainer arm 32B.

It should be noted that any of the attachers 32C can be referred to as a first, second, third, fourth, fifth, or etcetera, attacher.

Referring to FIG. 2C, in this embodiment, each attacher 32C is approximately equal distance radially (aligned vertically) with a corresponding alignment guide 30C. With this design, a flavor insert 16 (illustrated in FIG. 1B) can be slid into the alignment guide 30C and subsequently moved vertically downward to engage the corresponding attacher 32C.

Referring back to FIG. 1B, with this design, when the flavor inserts 16 are positioned within the insert retainer assembly 18, the flavor inserts 16 are inhibited from moving (e.g., floating) upward relative to the container 12 along the container longitudinal axis. Moreover, this design enables the flavor inserts 16 to be maintained spaced apart from the top 26.

With the present design, each individual flavor insert 16 can be added to the insert retainer assembly 18 by sliding the flavor insert 16 into one of the alignment guides 30C in one of the alignment arms 30B, and subsequently into a corresponding individual attacher 32C on one of the retainer arms 32B. In this embodiment, the retainer rack 32 inhibits further downward movement of the flavor insert 16 relative to the insert retainer assembly 18.

It should be noted that in this embodiment, the attachers 32C are located near the bottom 24 away from the container aperture 26D. Alternatively, for example, the insert retainer assembly 18 can be designed so that the attachers 32C are at another location, e.g. near the middle or top 26 of the container 12.

The connector assembly 34 fixedly connects the alignment rack 30 to the retainer rack 32 and is used to connect the insert retainer assembly 18 to the container 12. In one embodiment, as illustrated in FIG. 1B, the connector assembly 34 is a tube that extends along the container longitudinal axis 13, that maintains the alignment rack 30 spaced apart from the top 26, and maintains the retainer rack 32 spaced apart from the bottom 34. Alternatively, for example, the connector assembly 34 can maintain the position of one or both of the racks 30, 32 to be different than that illustrated in FIG. 1B.

In one embodiment, the components of the insert retainer assembly 18 can be made of stainless steel or another suitable material.

In one embodiment, the connector assembly 34 can include an oxygenator 36 that introduces a controlled amount of a fluid, e.g., oxygen, to the liquid 14 during the aging process. A suitable oxygenation assembly is described in detail in U.S. patent application Ser. No. 13/502,140 filed on Apr. 15, 2012, and entitled "Container Assembly For Aging A Liquid". As far as permitted, the contents of U.S. patent application Ser. No. 13/502,140 are incorporated herein by reference.

The mount assembly 20 secures the insert retainer assembly 18 to the container 12. In the embodiment illustrated in FIG. 1B, the mount assembly 20 includes a lower mount 20A for securing and/or mounting the connector assembly 34 to the bottom 24 of the container 12, and an upper mount 20B for securing and/or mounting the connector assembly 34 to top 26 of the container 12. In this embodiment, each mount 20A, 20B includes a bearing. With this design, the mount assembly 20 allows for easy and controlled rotation of the insert retainer assembly 18 relative to the container 12.

More specifically, in one embodiment, the lower mount 20A is substantially centrally located along the bottom 24 of the container 12 and is adapted to receive and retain the distal end of the connector assembly 34. Somewhat similarly, the upper mount 20A is substantially centrally located along the top 26 of the container 12, is adapted to receive and retain the connector assembly 34 with a proximal end of the connector assembly 34 extending therethrough. Moreover, the upper mount 20A can be adapted to seal the connector assembly 34 to the top 26 of the container 12.

Additionally, the container assembly 10 can include a rotator 38 (illustrated in FIG. 1A) that can be coupled to the proximal end of the connector assembly 34 for selectively rotating the insert retainer assembly 18 and the inserts 16 within the container 12. With the present design, the rotator 38 can be used to selective rotate the insert retainer assembly 18 and the flavor inserts 16 without opening the container 12, with the chamber 12A sealed and with the chamber 12A full of liquid 14.

In one embodiment, the rotator 38 can be a knob that can be manually and selectively rotated by the user. Alternatively, the rotator 38 can include a handle or some other means to enable the user to manually and selectively rotate the flavor inserts 16. Additionally and/or alternatively, the rotator 38 can include a motor (not illustrated) that enables the user to automatically rotate the insert retainer assembly 18 and the flavor inserts 16 within the chamber 12A.

One purpose for the rotation of the insert retainer assembly 18 is to enable the user to position the insert retainer assembly 18 so that the flavor inserts 16 of a particular row can be inserted into or removed from the chamber 12A via the container aperture 26D. Importantly, the flavor inserts 16 can be inserted or removed in this manner, as desired, when the chamber 12A is full of liquid 14 or when the chamber 12A contains no liquid.

An additional benefit to utilizing the rotator 38 to rotate the insert retainer assembly 18 and the flavor inserts 16 is that this operation effectively stirs the liquid 14 that is in the chamber 12A. This operation is easy to perform while the container 12 is in any orientation, horizontal, vertical or anywhere in between. This stirring process is referred to as "stirring of the lees", and it is required frequently during the aging of wine and spirits. For example, some winemakers stir the lees every 2 to 4 weeks. Moreover, the present stirring process as disclosed herein is much simpler and easier than traditional methods for stirring the lees, and it can do a much more thorough and consistent job of stirring than current traditional methods.

Stated in another fashion, the rotator 38 can be used to move the insert retainer assembly 18 and the flavor insert 16 to a calibrated angle to create more turbulence and resistance on the liquid 14 within the chamber 12A. This can be critical to stir any sediment of the wine residue which settles on the bottom of the container 12.

FIGS. 3A-3G are alternative view of the retainer rack 32 or portions thereof, including the retainer hub 32A, one or more retainer arms 32B, and/or one or more attachers 32C. In this embodiment, each attacher 32C is a clip or functions like a clip.

Figure 4A:
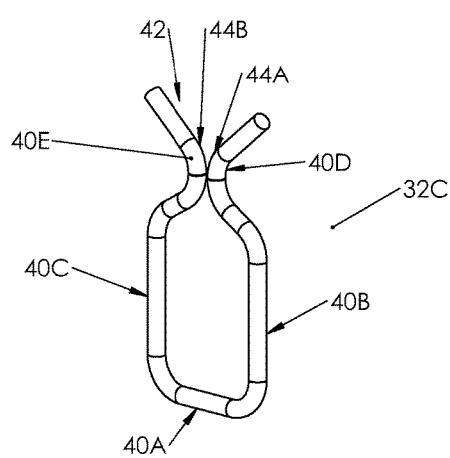
FIG. 4A is a perspective view of an attacher having features of the present invention.
Figure 4B:
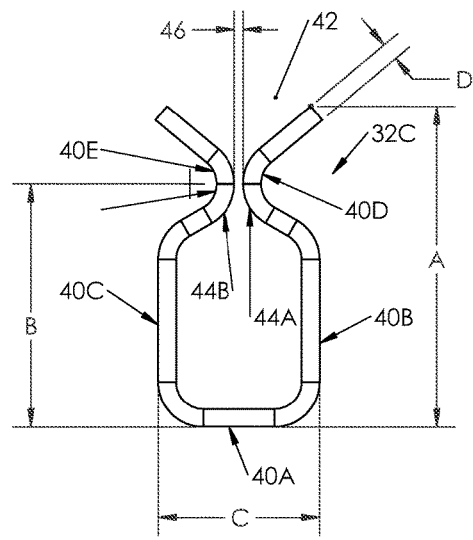
FIG. 4B is a side view of the attacher of FIG. 4A.

FIGS. 4A and 4B are alternative views of one of the attachers 32C (e.g. clip in this example). In this embodiment, the clip 32C is a continuous piece of resilient member that is permanently formed into the configuration illustrated in FIGS. 4A and 4B. In this embodiment, the clip 32C includes (i) a flat bottom 40A that is secured to the respective retainer beam 32D (illustrated in FIG. 2A) (ii) a right side 40B that extends upward from the flat bottom 40A, (iii) a left side 40C (spaced apart from the right side 40B) that extends upward from the flat bottom 40A, (iv) a right, somewhat "V" shaped top flange 40D that extends upward from the right side 40B, and (v) a left, somewhat "V" shaped top flange 40E that extends upward from the left side 40C. In this embodiment, each top flange 40D, 40E is positioned so that the bottom of the "V" for each of the top flanges 40D, 40E are adjacent to each other.

Stated in another fashion, in one embodiment, the top flanges 40D, 40E of the clip 32C cooperated to define a somewhat shaped "V" tapered opening 42 at the top of the clip 32C that tapers as you move downward on the clip 32C to define a pair of adjacent engagement regions 44A, 44B that are positioned below the top of the clip 32C. In one embodiment, the clip 32C is designed to be biased (in the non-deformed state) so that the engagement regions 44A, 44B are adjacent to each other. For example, the clip 32C can be designed to be biased so that the engagement regions 44A, 44B are in contact in the relaxed position. Alternatively, the clip 32C can be designed to be biased so that the engagement regions 44A, 44B are spaced apart a relatively small separation distance 46 in the relaxed position. In alternative, non-exclusive embodiments, the separation distance 46 can be less than approximately 0.03, 0.04, 0.05, 0.06, 0.07, 0.08, 0.09, or 0.1 inches.

In one embodiment, in the relaxed position, the clip 32C is designed so that the engagement regions 44A, 44B are spaced apart a separation distance 46 that less than the thickness of the flavor insert 16 so that the clip 32C can retain the flavor insert 16.

With reference to FIG. 4B, in one non-exclusive embodiment, (for a container sized similar to a present day wine barrel) the clip 32C can have the following dimensions (i) A is equal to approximately 2.24 inches; (ii) B is equal to approximately 1.7 inches; (iii) C is equal to approximately 1.3 inches; and (iv) D is equal to approximately 0.13 inches. Alternatively, these dimensions can be greatly increased for a much larger container with larger flavor inserts or smaller for a smaller container with smaller flavor inserts.

Alternatively, the clip 32C can have a configuration different than that illustrated in FIGS. 4A and 4B.

Figure 5A:
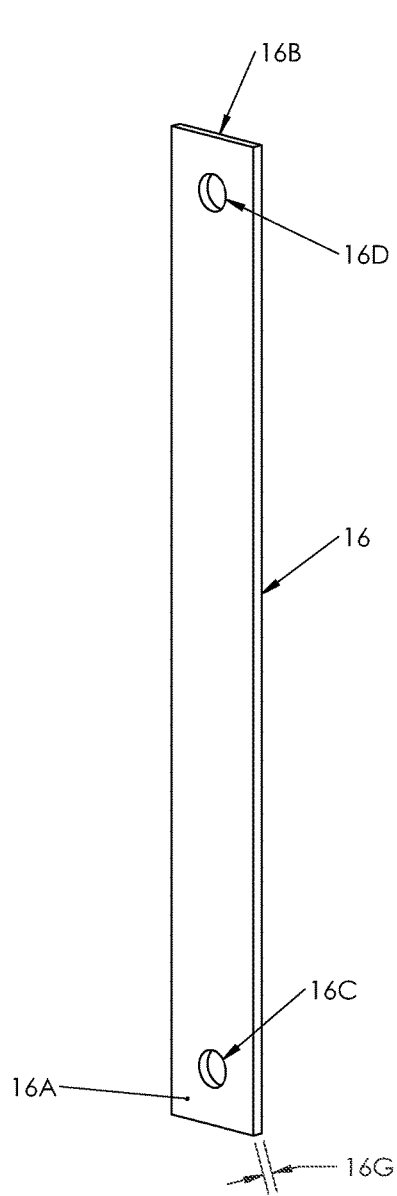
FIG. 5A is a perspective view of a flavor insert having features of the present invention.
Figure 5B:
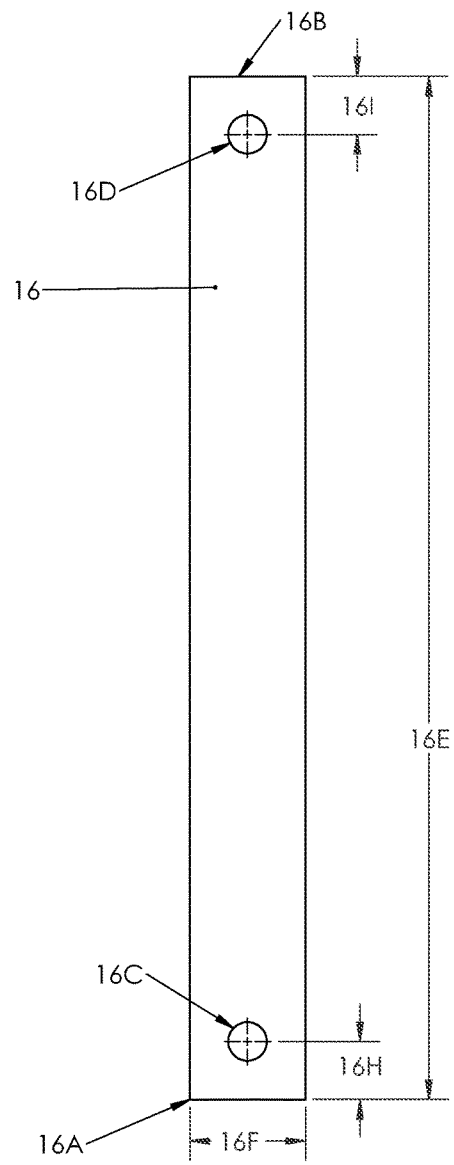
FIG. 5B is a side view of the flavor insert of FIG. 5A.
Figure 5C:
FIG. 5C is an end view of the flavor insert of FIG. 5A.

FIGS. 5A, 5B and 5C are alternative views of one of the flavor inserts 16 (also sometimes referred to as a stave). In this embodiment, the flavor insert 16 includes the distal, first end 16A, the opposed, proximal second end 16B, the retainer aperture 16C positioned near the first end 16A, and the removal aperture 16D positioned near the second end 16B. In this embodiment, the retainer aperture 16C is used to lock the flavor insert 16 with one of the clips 32C (illustrated in FIGS. 4A and 4B).

In one, non-exclusive embodiment, for use with a container that is approximately the same size as a standard wine barrel, the flavor insert 16 can have a length 16E of approximately twenty-eight inches, a width 16F of approximately three inches, and a thickness of approximately one-quarter of an inch. Alternatively other sizes and dimensions can be utilized. For example, these dimensions can be greatly increased for a much larger container or decreased for a smaller container.

Further, in certain embodiments, a distance 16H between the retainer aperture 16C and the first end 16A is approximately equal to a distance 16I between the removal aperture 16D and the second end 16B. With this design, the flavor insert 16 can be inserted in either direction. In one embodiment, the distance 16H between the center of the retainer aperture 16C and the first end 16A is approximately one and a half inches (1.5").

Alternatively, distances 16H, 16I can be different from each other, or one or both of the distances 16H, 16I can be greater or less than one and a half inches (1.5").

In one embodiment, each aperture 16C, 16D has a diameter of approximately one inch (1"). Alternatively, each aperture 16C, 16D can have a diameter of greater than or less than one inch (1").

Figure 6:
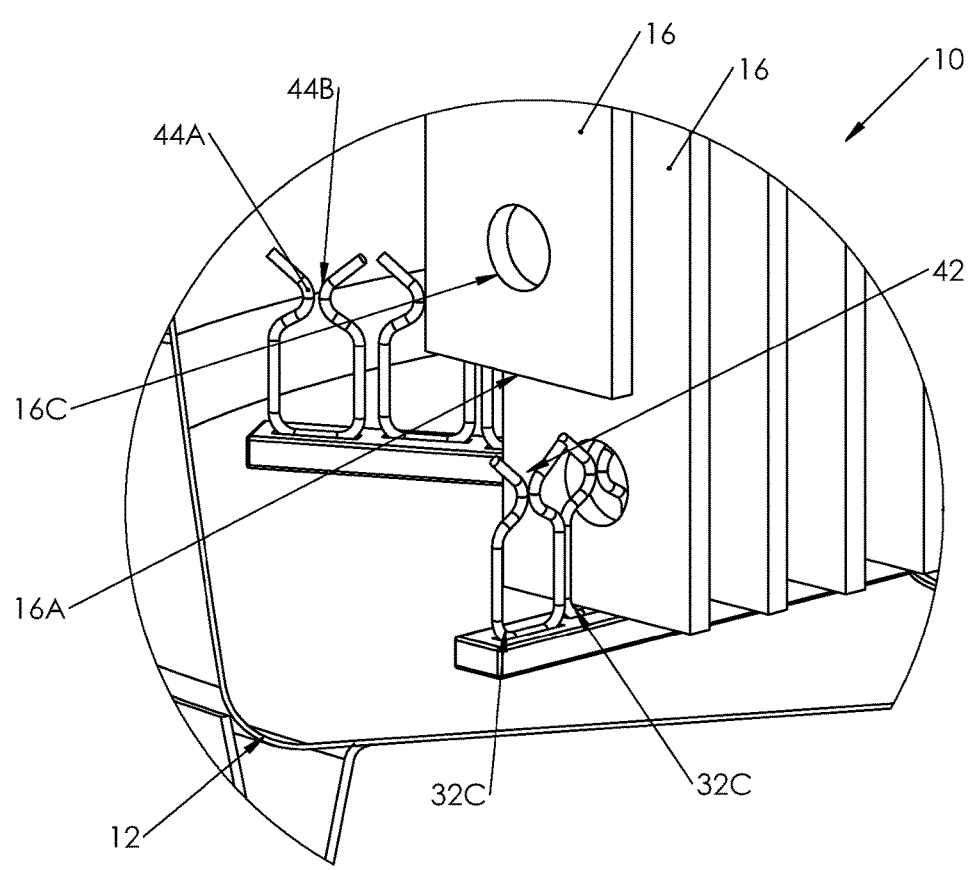
FIG. 6 is an enlarged view of a portion of the container assembly taken on line 6-6 in FIG. 1B.

FIG. 6 is an enlarged view of a portion of the container assembly 10 taken on line 6-6 in FIG. 1B. FIG. 6 illustrates one flavor insert 16 retained by one clip 32C, and another flavor insert 16 just above another clip 32C. In this embodiment, each clip 32C flexes to open when sufficient pressure is applied with the respective flavor insert 16. Further, in this embodiment, each clip 32C includes the pair of engagement region 44A, 44B that are urged apart when sufficient pressure is applied with the respective flavor insert 16, and that biased to move adjacent to each other so that the engagement regions 44A, 44B fit into the respective retainer aperture 16C.

With this design, when the flavor insert 16 is moved downward in the container 12, the distal end 16A will engage the tapered opening 42 of the clip 32C, which will guide the distal end 16A towards the engagement regions 44A, 44B. Subsequently if sufficient pressure is applied with the flavor insert 16, the clip 32B will temporarily deform and the engagement regions 44A, 44B will separate to allow the distal end 16A to slide between the engagement regions 44A, 44B. Subsequently, when the flavor insert 16 is moved so that the retainer aperture 16C is located adjacent to the engagement regions 44A, 44B, the clip 32B will urge the engagement regions 44A, 44B towards each other and the engagement regions 44A, 44B will maintain the position of the flavor insert 16.

Alternatively, during removal, if sufficient upward pressure is applied with the flavor insert 16, the clip 32B will temporarily deform and the engagement regions 44A, 44B will separate to allow the distal end 16A to slide between the engagement regions 44A, 44B. Subsequently, when the flavor insert 16 is moved above the engagement regions 44A, 44B, the clip 32B will urge the engagement regions 44A, 44B towards each other.

FIGS. 7A-7D illustrate another embodiment of an attacher 732C having features of the present invention that can be used to retain a single flavor insert. In this embodiment, the attacher 732C is a clamp that can be selectively moved between on open position 750 illustrated in FIGS. 7A, 7C and 7D, and a closed position 752 illustrated in FIG. 7B. For example, the clamp 732C can be secured to the retainer beam 32D (illustrated FIG. 2A) or another structure within the container.

In this embodiment, the clamp 732C is initially in then open position. However, when a force 754 (illustrated with an arrow) is applied to an initially, arched shaped bottom 740A of the clamp 732C, the bottom 740A changes shape. This causes two, opposed jaw regions 756A, 756B to move together.

Figure 7A:
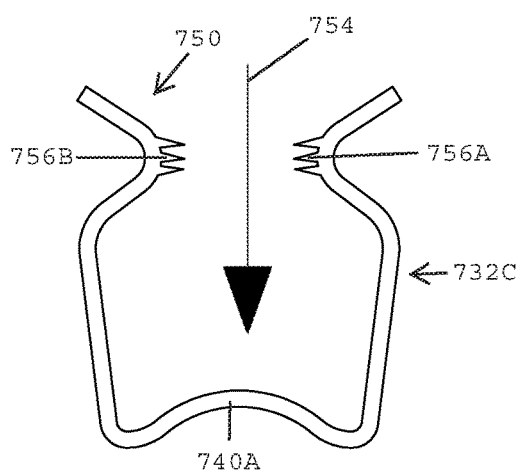
FIG. 7A is a side view of another embodiment of an attacher having features of the present invention in an open position.
Figure 7C:
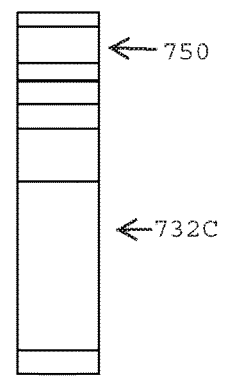
FIG. 7C is an end view of the attacher of FIG. 7A.
Figure 7B:
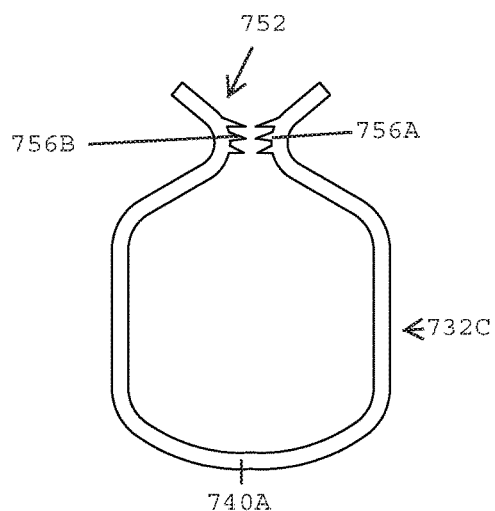
FIG. 7B is a side view of the attacher of FIG. 7A in a closed position.
Figure 7D:
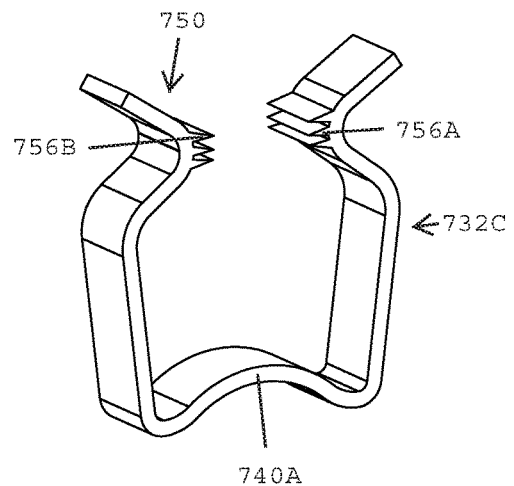
FIG. 7D is a perspective view of the attacher of FIG. 7A.
Figure 7F:
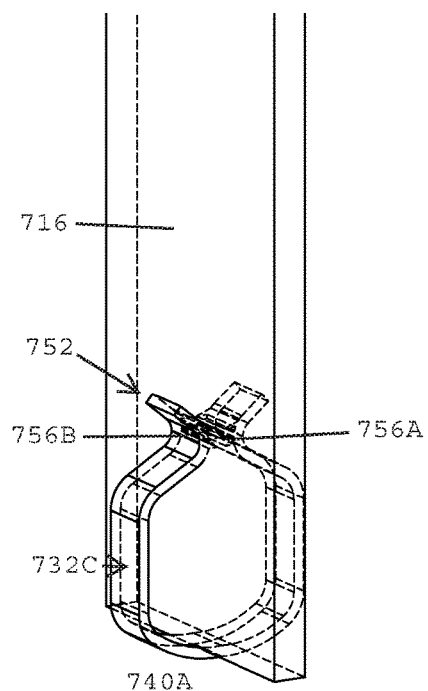
FIG. 7F is a perspective view of a portion of a flavor insert and the attacher of FIG. 7A in the closed position.
Figure 7E:
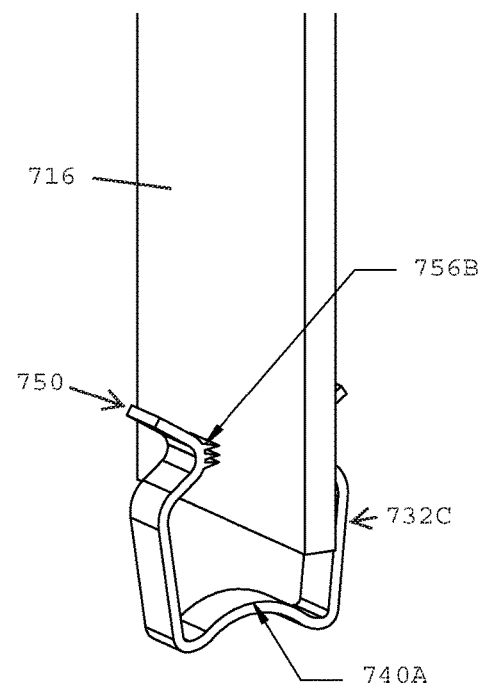
FIG. 7E is a perspective view of a portion of a flavor insert and the attacher of FIG. 7A in the open position.

FIG. 7E is a perspective view of a portion of a flavor insert 716 and the attacher 732A of FIG. 7A in the open position 750. In this embodiment, the flavor insert 716 does not include the retainer aperture. In the open position 750, the jaw regions 756A, 756B (only one is visible in FIG. 7E) are spaced apart and the bottom 740A is arched. With this design, the flavor insert 716 can be moved downward between the jaw regions 756A, 756B into the clamp 732A.

FIG. 7F is a perspective view of a portion of a flavor insert 716 and the attacher 732A of FIG. 7A in the closed position 752. Contact between the flavor insert 716 and the bottom 740B has caused the jaw regions 756A, 756B (partly illustrated in phantom) to be urged together to retain the individual flavor insert 716.

Still other types of attachers can be utilized. For example, one or more of the attachers can be another type of clamping device, a barbed V shaped slot. or another type pinching mechanism.

While a number of exemplary aspects and embodiments of a container assembly 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A container assembly for retaining a liquid during aging of the liquid, the container assembly comprising:
a container that defines a chamber which receives and retains the liquid;
a first flavor insert that imparts a flavor on the liquid, the first flavor insert having a length, a width and a thickness that is less than the length and the width; and
an insert retainer assembly positioned within the chamber, the insert retainer assembly being secured to the container, the insert retainer assembly including an alignment rack and a retainer rack; wherein the alignment rack includes a first alignment guide that guides the first flavor insert during positioning of the first flavor insert within the container, the first alignment guide including an aperture that is larger than a cross-section of the first flavor insert; wherein the retainer rack has a first attacher that selectively and individually engages the first flavor insert to inhibit large scale movement of the first flavor insert relative to the retainer rack; the first attacher including a first clip that flexes open when sufficient pressure is applied with the first flavor insert, wherein the first clip includes a pair of engagement regions that are urged apart when sufficient pressure is applied with the first flavor insert, and that are biased to move adjacent to each other so that the engagement regions retain the first flavor insert; and wherein the pair of engagement regions are biased to be positioned a separation distance from one another when in a relaxed position, the separation distance being less than the thickness of the first flavor insert.

2. The container assembly of claim 1 wherein the container has a container top and a container bottom; and wherein the alignment rack is positioned closer to the container top than is the retainer rack.

3. The container assembly of claim 1 wherein the container has a container longitudinal axis and wherein the first clip inhibits movement of the first flavor insert along an axis that is substantially parallel to the container longitudinal axis.

4. The container assembly of claim 1 wherein the first flavor insert includes a retainer aperture and wherein the first clip fits into at least a portion of the retainer aperture to engage the first flavor insert.

5. The container assembly of claim 1 further comprising a second flavor insert that imparts a flavor on the liquid, wherein the alignment rack includes a second alignment guide that guides the second flavor insert during positioning of the second flavor insert within the container; and wherein the retainer rack has a second attacher that selectively and individually engages the second flavor insert to inhibit large scale movement of the second flavor insert relative to the retainer rack; the second attacher including a second clip that flexes open when sufficient pressure is applied with the second flavor insert.

6. The container assembly of claim 1 wherein the first flavor insert is straight beam-shaped having a rectangular cross-section.

7. The container assembly of claim 1 wherein the container further includes a container aperture that allows for the insertion of the first flavor insert into the insert retainer assembly through the container aperture.

8. The container assembly of claim 1 further comprising a rotator that is coupled to the insert retainer assembly; and wherein the insert retainer assembly and the first flavor insert can be selectively rotated and positioned relative to the container with the rotator to create more turbulence in the liquid, and to stir the liquid.

9. A container assembly for retaining a liquid during aging of the liquid, the container assembly comprising:
   a container that defines a chamber which receives and retains the liquid;
   a first flavor insert that imparts a flavor on the liquid; and
   an insert retainer assembly positioned within the chamber, the insert retainer assembly being secured to the container, the insert retainer assembly including an alignment rack and a retainer rack; wherein the alignment rack includes a first alignment guide that guides the first flavor insert during positioning of the first flavor insert within the container, the first alignment guide including an aperture that is larger than a cross-section of the first flavor insert; wherein the retainer rack has a first attacher that selectively and individually engages the first flavor insert to inhibit large scale movement of the first flavor insert relative to the retainer rack; the first attacher including a first clip that flexes open when sufficient pressure is applied with the first flavor insert; wherein the retainer rack includes a retainer hub and a retainer arm that extends radially away from the retainer hub; and wherein the retainer arm includes the first attacher that selectively and individually engages the first flavor insert to inhibit large scale movement of the first flavor insert relative to the retainer rack.

10. The container assembly of claim 9 wherein the first clip includes a pair of engagement regions that are urged apart when sufficient pressure is applied with the first flavor insert, and that are biased to move adjacent to each other so that the engagement regions retain the first flavor insert.

11. A container assembly for retaining a liquid during aging of the liquid, the container assembly comprising:
    a container that defines a chamber which receives and retains the liquid;
    a first flavor insert that imparts a flavor on the liquid; and
    an insert retainer assembly positioned within the chamber, the insert retainer assembly being secured to the container, the insert retainer assembly including an alignment rack and a retainer rack; wherein the alignment rack includes a first alignment guide that guides the first flavor insert during positioning of the first flavor insert within the container, the first alignment guide including an aperture that is larger than a cross-section of the first flavor insert; wherein the retainer rack has a first attacher that selectively and individually engages the first flavor insert to inhibit large scale movement of the first flavor insert relative to the retainer rack; the first attacher including a first clip that flexes open when sufficient pressure is applied with the first flavor insert; wherein the alignment rack includes an alignment hub and an alignment arm that extends radially away from the alignment hub; and wherein the alignment arm includes the first alignment guide that guides the first flavor insert during positioning of the first flavor insert within the container.

12. The container assembly of claim 11 wherein the first clip includes a pair of engagement regions that are urged apart when sufficient pressure is applied with the first flavor insert, and that are biased to move adjacent to each other so that the engagement regions retain the first flavor insert.

13. A container assembly for retaining a liquid during aging of the liquid, the container assembly comprising:
    a container that defines a chamber which receives and retains the liquid;
    a first flavor insert that imparts a flavor on the liquid, the first flavor insert having a length, a width and a thickness that is less than the length and the width; and
    an insert retainer assembly positioned within the chamber, the insert retainer assembly being secured to the container, the insert retainer assembly including a retainer rack having a first attacher that selectively and individually engages the first flavor insert to inhibit large scale movement of the first flavor insert relative to the retainer rack; wherein the first attacher includes a first clip that flexes open when sufficient pressure is applied with the first flavor insert; and wherein the first clip includes a pair of engagement regions that are urged apart when sufficient pressure is applied with the first flavor insert, and that are biased to be positioned a separation distance from one another when in a relaxed position, the separation distance being less than the thickness of the first flavor insert.

14. The container assembly of claim 13 wherein the container has a container longitudinal axis and wherein the first clip inhibits movement of the first flavor insert along an axis that is substantially parallel to the container longitudinal axis.

15. The container assembly of claim 13 wherein the first flavor insert includes a retainer aperture and wherein the first clip fits into at least a portion of the retainer aperture to engage the first flavor insert.

16. The container assembly of claim 13 further comprising a second flavor insert that imparts a flavor on the liquid, and wherein the retainer rack has a second attacher that selectively and individually engages the second flavor insert to inhibit large scale movement of the second flavor insert relative to the retainer rack.

17. The container assembly of claim 16 wherein the second attacher includes a second clip that flexes open when sufficient pressure is applied with the second flavor insert; and wherein the second clip includes a pair of second engagement regions that are urged apart when sufficient pressure is applied with the second flavor insert, and that are biased to move adjacent to each other so that the second engagement regions retain the second flavor insert.

18. The container assembly of claim 13 wherein the insert retainer assembly further includes an alignment rack that is spaced apart from the retainer rack, the alignment rack includes an alignment hub and an alignment arm that extends radially away from the alignment hub; and wherein the alignment arm includes a first alignment guide that guides the first flavor insert during positioning of the first flavor insert within the container.

19. The container assembly of claim 13 wherein the container further includes a container aperture that allows for the insertion of the first flavor insert into the insert retainer assembly through the container aperture.

20. The container assembly of claim 13 wherein the insert retainer assembly and the first flavor insert can be selectively rotated and positioned relative to the container to create more turbulence in the liquid, and to stir the liquid.

* * * * *